July 30, 1968  F. C. KURZAWA  3,394,734
AUXILIARY ROTARY VALVE OPERATING MECHANISM
Filed Feb. 25, 1966  2 Sheets-Sheet 1
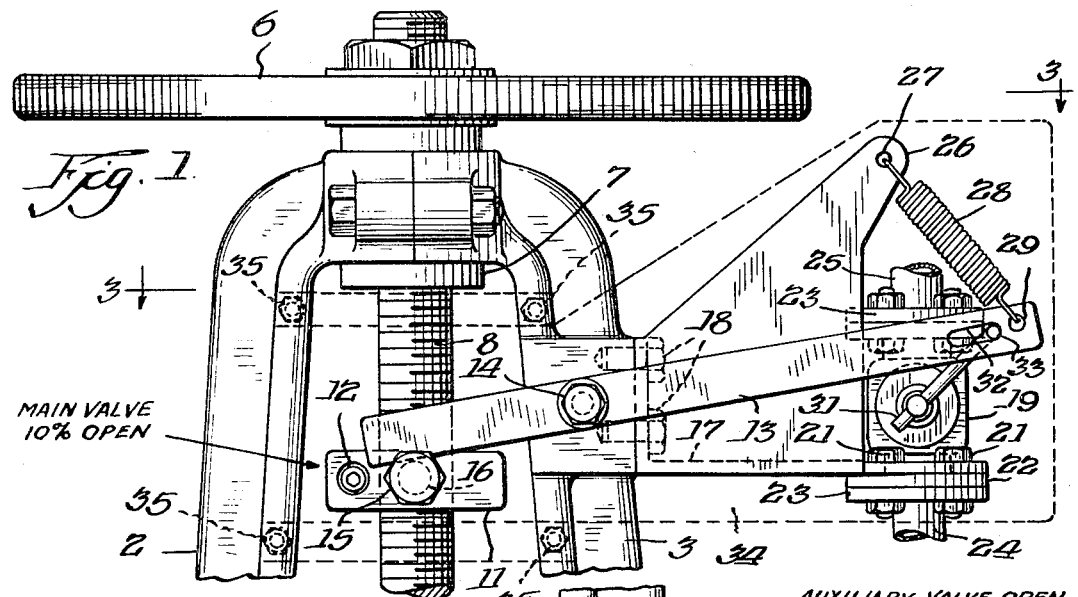
Fig. 1.
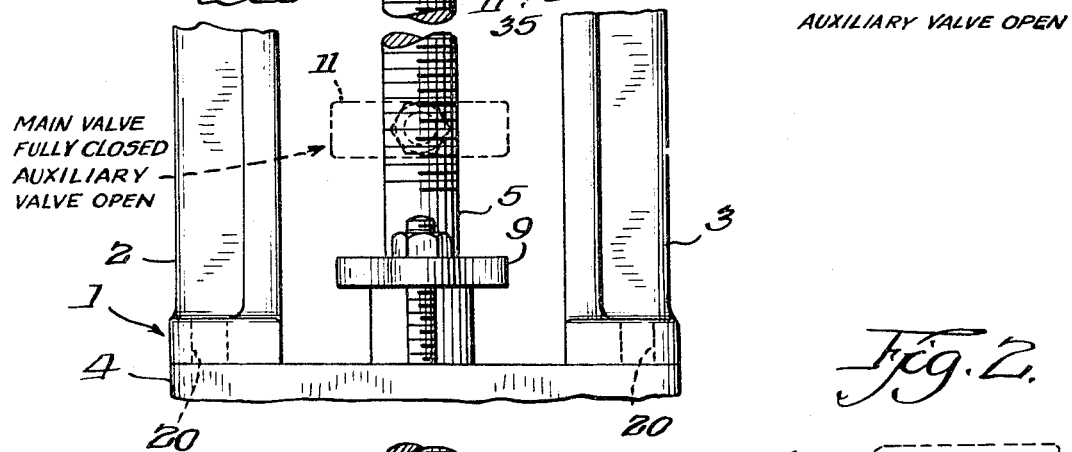
Fig. 2.
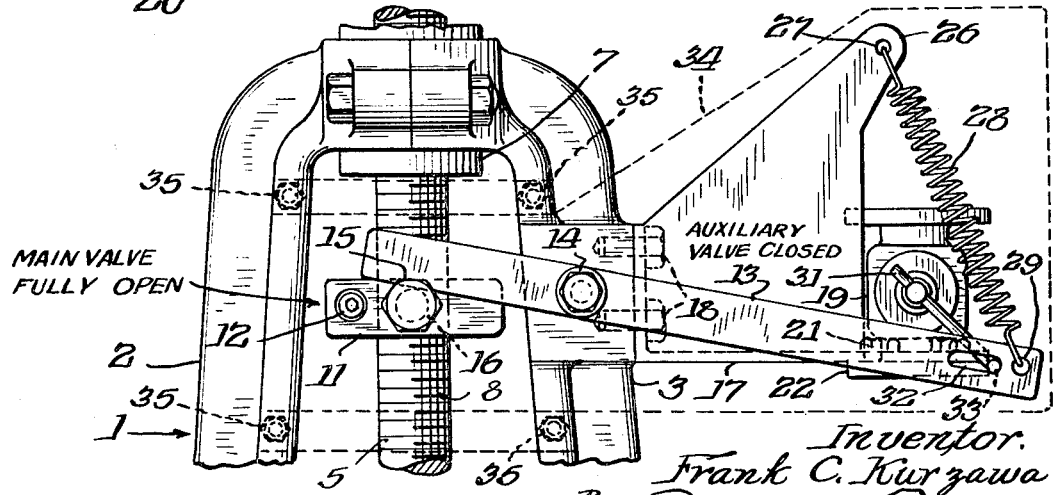
Inventor.
Frank C. Kurzawa
By Joseph O. Lange Atty.

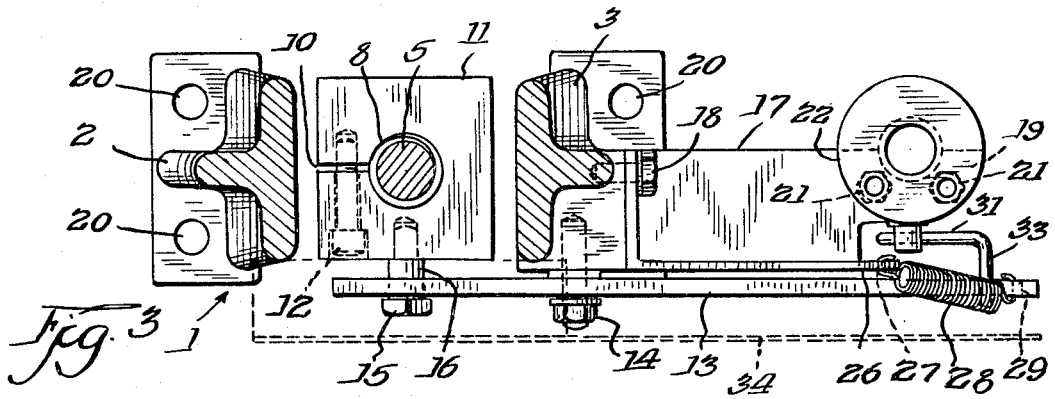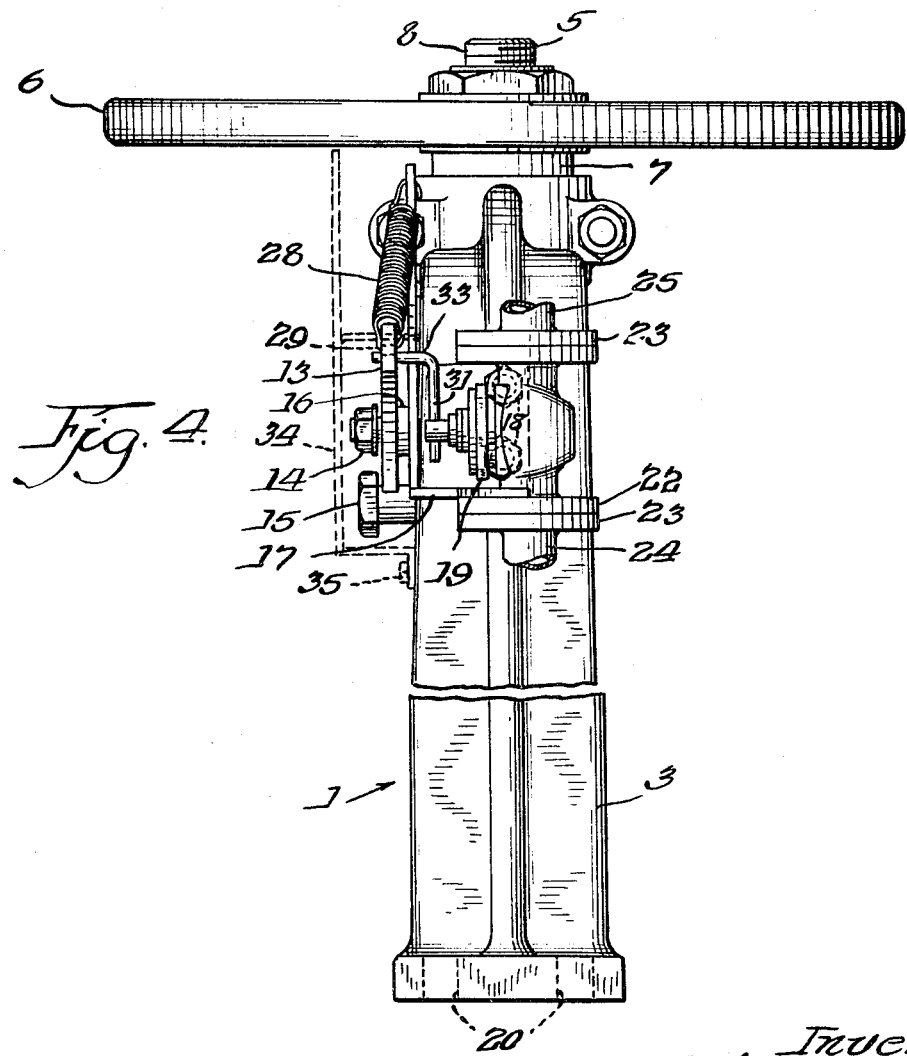

United States Patent Office 3,394,734
Patented July 30, 1968

3,394,734
AUXILIARY ROTARY VALVE OPERATING MECHANISM
Frank C. Kurzawa, Chicago, Ill., assignor to Crane Co., Chicago, Ill., a corporation of Illinois
Filed Feb. 25, 1966, Ser. No. 530,204
8 Claims. (Cl. 137—609)

This invention relates broadly to a novel auxiliary rotary valve operating mechanism, and, more particularly, it is concerned with a type of operating mechanism capable of being actuated by a main valve employing a rising non-rotatable valve stem.

In order to obtain a better appreciation of the significance of this contribution, it should be understood that in many services for which valves are required, the performance of the main valve with respect to a cooperating auxiliary valve requires a certain unique assembly therebetween.

For example, in one special type of service, say, in a power plant or central station, it may be necessary on occasion to isolate a turbine from an exhaust stem header, while at the same time, assuring that the initiation of such isolation of the turbine will close the turbine inlet trip means should the latter be inadvertently open.

This type of situation requires that the main valve and the auxiliary valve cooperating therewith be mechanically linked and that such linkage be not only of rugged construction, but preferably enclosed or otherwise made tamperproof.

It is a further object in such described installation to require that the main valve be capable of actuating the auxiliary valve at predetermined positions of the main valve with no manual operation of the auxiliary valve being separately required. In such cases, the auxiliary valve may be spring-loaded so as to open when the main valve linkage therebetween fails or is disengaged when the main valve reaches a predetermined position. Specifically, the cooperative relationship between the main valve and the auxiliary valve is such that the linkage arrangement will keep the auxiliary valve open when the main line is closed, thus to prevent any possible explosion or mis-use of the main line flow.

In such special installations, it is frequently the requirement that the auxiliary valve is so constructed that it will be automatically closed when the valve on the main line is fully open or that the auxiliary valve will fully open when the main valve disc or closure member is in a partly closed position, measurable, for example, to a degree of say 10% of the lift or more of the main valve. The auxiliary valve will remain fully open when the main valve is fully closed.

In an installation of the type referred to, it is, of course, preferable that the linkage between the main valve and the auxiliary valve be one embodying a mechanical design as distinguished from any electrical actuation, so that there are no electrical fuses to fail in the matter involving highly dangerous uses of fluid flow.

Another object is to provide for an arrangement between the auxiliary valve and the main valve so that the former is spring loaded to cause the auxiliary valve to open at all times except when actuated by the linkage arrangement.

Another object of this invention is to provide for an auxiliary valve operating mechanism, constituting an improvement over U.S. Patent No. 2,881,784, issued Apr. 14, 1951, and assigned to Crane Co., Chicago, Ill.

Other objects and advantages will become more readily apparent upon proceeding with the following description read in light of the accompanying drawings, in which:

FIG. 1 is a fragmentary view of the upper structure of a main valve utilizing my invention and showing the auxiliary rotary valve in elevation and in open position, while the main valve is partially open;

FIG. 2 is a view similar to that of FIG. 1, but with the auxiliary rotary valve in the closed position and the main valve is indicated as being fully open;

FIG. 3 is a transverse sectional view taken substantially on the line 3—3 of FIG. 1; and FIG. 4 is a side exterior view of the assembly shown in FIG. 1.

Similar reference numerals refer to similar parts throughout the several views.

Referring now to FIG. 1, let it be assumed that the valve yoke 1 consisting of a pair of oppositely disposed yoke arms 2 and 3 apertured as at 20 for attaching bolts (not shown) is positioned on the bonnet flange of a conventional main valve 4, employing a rising non-rotatable threaded valve stem 5 actuated in the usual manner by means of a rotatable handwheel 6, non-rotatably mounted on the yoke sleeve 7, the latter being internally threaded (not shown) to receive the threaded portion 8 of the valve stem 5 whereby upon suitable rotation of the said yoke sleeve 7, the non-rotatable stem is caused to move in a reciprocating or axial manner upon suitable rotation of the handwheel 6.

In the usual manner, the stuffing box gland 9 is provided to compress the valve packing (not shown) around the stem 5. In the axial position of the main valve stem as shown in FIG. 1, the preferably adjustable lever actuating nut 11 is mounted on the stem 5 over the stem threads 8 in the manner more clearly shown in the conventional view of FIG. 3. The end-slotted portion of the nut 11 is provided as at 10 to permit tightening the said nut to prevent possible rotation on the stem threads 8, said slotted nut being preferably locked by means of the set-screw 12. While a threaded stem is shown, it is possible that under certain conditions the valve stem may be a sliding stem non-rotatably mounted to actuate a valve closure member.

With the aforementioned description, it should now be clear that as the main valve stem 5 moves in axial direction, depending upon whether the main valve is being opened or closed, the adjustable lever actuating nut 11 will move axially with the stem.

In connection with the latter arrangement, it must now be understood that a pivotally mounted lever 13 is arranged in cooperation with the movement of the said valve stem 5 and the adjustable lever actuating nut 11. The lever 13 is attached as shown to the padded portion of the yoke arm 3 for pivotal movement thereof by means of the pivot screw 14. A transversely positioned pin or threaded cap screw 15 is mounted in the side of the nut 11, as indicated more clearly in FIG. 3. It is preferably provided with the enlarged shank portion 16 upon which the lever 13 is supported and actuated during the movement of the main valve in an opening direction.

To the said padded portion of the yoke arm 3, as indicated, a mounting bracket 17 is attached by means of the cap screws 18, the purpose of which is to position and support thereon a rotary valve, such as a ball valve, a plug valve, a butterfly valve, or the like, designated 19.

As shown in FIG. 3, the said auxiliary rotary valve is attached to the bracket 17 by means of the through-bolts 21 of the end flange connection 22 of the auxiliary valve body and assembled to a conventional companion flange 23 adapted to receive the outlet of the pipe line 24 (FIG. 1) for effecting a pipe connecting end of the auxiliary valve. In a similar manner, at the upper end of the auxiliary valve 19, another companion flange 23 is provided and arranged to receive the inlet piping 25 leading to the valve 19. The aforementioned description is more clearly apparent in FIG. 1. It should be understood that in the upper end of the bracket 17, an apertured extension 26 is provided, apertured as at 27, to receive one end of the coil spring 28, having at its opposite end portion the engagement with the lever 13 as at 29. A suitable actuating lever is attached to the closure member of the auxiliary rottary valve as indicated at 31, the latter member being mounted so as to cooperate with the slotted portion 32 in the pivotally mounted lever 13, the engagement between said actuating lever 31 and the slotted portion 32 being accomplished by a transversely extending and preferably integral pin 33, the pin being formed from the lever portion 31 as more clearly shown in FIG. 3. In viewing the pivotal movement of the lever 13, it should, of course, be understood that all valves generally close in a clockwise direction and open in a counterclockwise direction and the same explanation applies to the main valve.

In the matter of operation of the auxiliary valve, it should be noted that as indicated and with the lever 13 in the position shown as indicated in FIG. 1, the main valve is about 10% open. In this position, as also indicated, the auxiliary valve is in the open position.

Let it now be assumed that the main valve is to be fully opened, as more clearly shown in FIG. 2, which is accomplished by rotation of the handwheel 6 in a counterclockwise direction when viewed in plan. In such case, the lever actuating nut 11 will be moved axially upward to the position indicated in this figure and thereby cause the pivotally mounted lever 13 to be displaced to the position indicated in FIG. 2. Such movement of the lever causing the auxiliary valve lever 31 to be rotated in a clockwise direction and thereby closing the auxiliary valve as shown in this figure. It should be noted that except when actuated by the pivotally mounted lever 13, the coiled spring 28 causes the auxiliary valve to open at all times, so that in the event the lever 13 should accidentally be damaged or otherwise incapable of transmitting the desired rotational force to the auxiliary valve, the spring 28 will cause the auxiliary valve to be rotated in a counterclockwise direction and thereby promptly opened.

The main valve in the fully closed position is indicated by the dotted lines depicting the lever actuating nut 11 as indicated in the fragmentary lower section of FIG. 1, in which latter case the auxiliary valve is open as indicated by virtue of the aforesaid spring action rotating the closure member of the rotary auxiliary valve to the position shown in the upper fragmentary portion of FIG. 1.

It will, of course, be understood that for purpose of rendering the aforementioned structural assembly relatively free from misuse or tampering, it is preferable to provide the enclosure, as indicated in the dotted lines at 34. The said enclosure is attached to the yoke arms by means of the screws 35, shown more clearly in FIG. 1.

With the aforementioned description in mind, let it now be assumed, for example, that the described invention is associated with the conventional turbine inlet trip valve (not shown), the latter mentioned valve being held open by hydraulic oil pressure, and is intended to close on a pressure failure. Upon the occurrence of such failure. the auxiliary valve 19 which is piped as at 25 acts as a dump valve as hereinafter described. Said oil line will be opened by suitable movement of the main valve to the closed position. Thus, the auxiliary valve functions as a dump valve for the oil feed line, relieving the pressure when it is opened to the position as indicated in FIG. 1 and closing the turbine inlet trip valve. In the particular configuration shown and described, the auxiliary valve is thus fully closed when the main valve is 10% open, depending upon the conditions required for the purpose. The further requirement in the illustration is that the auxiliary valve will remain open as the main valve 4 is moved from the 10% open position to the 100% closed position. The foregoing is a brief description of a system of operation for which the piping and valve cooperative arrangement has been used.

It will, of course, be appreciated that while only a single embodiment has been shown and described, this is for purpose of illustration and not limitation. The scope of the invention should therefore be measured by the appended claims read in light of the art of record.

I claim:

1. The combination comprising a main valve having a non-rotatable rising valve stem for actuating a reciprocally movable closure member therfor, a yoke for the main valve for journalling said valve stem, a lever actuating nut member mounted on said stem at a predetermined axial location, a pivotally mounted lever on the yoke movable in a plane substantially parallel to the axial movement of the said stem, the said lever being a suitably slotted apertured portion at an end portion thereof, a rotary type of auxiliary valve fixedly supported adjacent to said main valve, said auxiliary valve having a rotatable closure member with rotatable actuating means therefor cooperating with said pivotally mounted lever, the said rotatable actuating means engaging said slotted apertured portion of the pivotally mounted lever to effect said cooperation, the end portion of said pivotally mounted lever opposite said slotted apertured portion being supported on said lever actuating nut member whereby said lever actuating nut member is effective to engage and swing said pivotally mounted lever and thereby actuate said auxiliary valve closure member and move said rotatable actuating means through at least a portion of said slotted apertured portion of the pivotally mounted lever to close the auxiliary valve as said main valve has moved to a valve open position, said closure member of the auxiliary valve being rotated from the open to the closed position during at least the last part of the said swinging movement of the pivotal lever, the said lever actuating nut member being selectively mounted on the said main valve stem.

2. The subject matter of claim 1, the said main valve stem being threaded for at least a portion of its length for engagement with said yoke.

3. The subject matter of claim 1, the said yoke having a plurality of yoke arms, the said pivotally mounted lever being supported on one of said yoke arms and spanning the space between said stem and said yoke arm to contact said lever actuating nut.

4. The subject matter of claim 1, the said rotatable actuating means comprising a lever having a transversely extending pin for cooperation with said slotted apertured portion of the pivotally mounted lever.

5. The subject matter of claim 1, the said lever actuating nut member having a transversely positioned pin-like member with an enlarged shank portion for support of said pivotally mounted lever during predetermined movement of the main valve.

6. The combination comprising a main valve having a non-rotatable rising valve stem for actuating a reciprocally movable closure member therefor, a yoke for the main valve for journalling said valve stem, a lever actuating nut member mounted on said stem at a predetermined axial location, a pivotally mounted lever on the yoke movable in a plane substantially parallel to the axial movement of the said stem, the said lever having a suitably slotted apertured portion, a bracket mounted on said main valve, a rotary type of auxiliary valve fixedly supported on said bracket relatively adjacent to said main valve, said auxiliary valve having a rotatable closure member with rotatable actuating means therefor cooperating with said pivotally mounted lever, the said rotatable actuating means engaging said slotted apertured portion of the pivotally mounted lever to provide said cooperation, the opposite end portion of said pivotally mounted lever at an end opposite said slotted apertured portion bearing on said lever actuating nut member whereby said lever actuating nut member is effective to engage and swing said pivotally mounted lever and move said rotatable actuating means thereby to move the said closure member actuating means of the auxiliary valve through at least a portion of said slotted apertured portion of the pivotally mounted lever whereby to close the auxiliary valve as said main valve has moved to a valve open position, said closure member of the auxiliary valve being rotated from the open to the closed position during at least the last part of the said swinging movement of the pivotal lever, the said lever actuating nut member being selectively mounted on the said main valve stem, resilient means extending between said bracket and the slotted apertured end of said pivotally mounted lever whereby to normally maintain said auxiliary valve in the open position except when the said pivotally mounted lever is actuated by suitable movement of said lever actuating nut.

7. The subject matter of claim 6, the said bracket having means thereon for supporting said auxiliary valve.

8. The subject matter of claim 7, the said bracket engaging said auxiliary valve to support the latter member being applied at a pipe connecting end of the said auxiliary valve.

References Cited

UNITED STATES PATENTS

| | | | |
|---|---|---|---|
| 622,114 | 3/1899 | Burdett | 137—595 |
| 2,881,784 | 4/1959 | Bryant | 137—246.13 |
| 2,969,087 | 1/1961 | Raney | 137—609 |
| 3,011,509 | 12/1961 | Wilson | 137—609 XR |
| 3,218,023 | 11/1965 | Kirkup | 137—609 XR |
| 3,276,476 | 10/1966 | Jackson | 137—609 XR |

SAMUEL SCOTT, *Primary Examiner.*